US009742262B1

(12) United States Patent
Jutras

(10) Patent No.: US 9,742,262 B1
(45) Date of Patent: Aug. 22, 2017

(54) SWITCHING POWER SUPPLY STARTUP CIRCUIT WITH NORMALLY ON DEVICE PROVIDING STARTUP CHARGING CURRENT

(71) Applicant: Bel Fuse (MACAO COMMERCIAL OFFSHORE) Limited, Andar H-K (MO)

(72) Inventor: Mark Jutras, Upton, MA (US)

(73) Assignee: Bel Fuse (Macao Commerical Offshore) Limited, Andar H-K (MO)

( * ) Notice: Subject to any disclaimer, the term of this patent is extended or adjusted under 35 U.S.C. 154(b) by 0 days.

(21) Appl. No.: 15/148,302

(22) Filed: May 6, 2016

(51) Int. Cl.
*H02M 1/32* (2007.01)
*H02M 3/335* (2006.01)
*H02M 1/36* (2007.01)
*H02M 3/24* (2006.01)
*H02M 1/00* (2006.01)

(52) U.S. Cl.
CPC ............ *H02M 1/36* (2013.01); *H02M 3/24* (2013.01); *H02M 3/335* (2013.01); *H02M 1/32* (2013.01); *H02M 3/33523* (2013.01); *H02M 2001/0006* (2013.01)

(58) Field of Classification Search
CPC .. H02M 2001/0006; H02M 1/32; H02M 1/36; H02M 3/24; H02M 3/335; H02M 3/33523; H02M 3/33553
See application file for complete search history.

(56) References Cited

U.S. PATENT DOCUMENTS

| 7,443,702 | B2 | 10/2008 | Yang et al. |
| 7,525,819 | B2 | 4/2009 | Choi |
| 7,924,581 | B2 | 4/2011 | Hsu |
| (Continued) | | | |

FOREIGN PATENT DOCUMENTS

CN        102545575 A    7/2012

OTHER PUBLICATIONS

Hao and Xingbi, "A novel high voltage start up circuit for an integrated switched mode power supply," Journal of Semiconductors, vol. 31, No. 9 (2010).
(Continued)

*Primary Examiner* — Fred E Finch, III
(74) *Attorney, Agent, or Firm* — Bainwoodhuang

(57) ABSTRACT

A power converter startup circuit establishes an operating voltage for control circuitry during startup and is then disabled to reduce no-load power dissipation. The startup circuit has a normally on characteristic to automatically provide startup charging current for a startup capacitor. The control circuitry begins operating as the startup capacitor voltage reaches an operating value, and it generates an inhibitory signal that disables the startup circuit to stop the startup charging current and reduce power dissipation. The normally on characteristic is achieved by an emitter switched current source employing a normally on device such as a depletion-mode J-FET. A resistor divider network provides both biasing for the startup current source and a point of monitoring the power supply input voltage during steady state operation. A charge pump provides a voltage of the inhibitory control signal sufficiently above the auxiliary voltage to turn off the normally on switching transistor.

14 Claims, 6 Drawing Sheets

(56) References Cited

U.S. PATENT DOCUMENTS

| | | | |
|---|---|---|---|
| 8,629,631 B1* | 1/2014 | Rhodes | H02M 1/36 315/227 R |
| 9,106,149 B2 | 8/2015 | Dunipace | |
| 9,337,720 B2 | 5/2016 | Jutras | |
| 2007/0058398 A1 | 3/2007 | Yang et al. | |
| 2007/0236970 A1 | 10/2007 | Yang et al. | |
| 2010/0103705 A1 | 4/2010 | Fang et al. | |
| 2010/0259952 A1 | 10/2010 | Zhu et al. | |
| 2012/0025608 A1* | 2/2012 | Melanson | H02M 1/36 307/24 |
| 2012/0163047 A1 | 6/2012 | Kubota et al. | |
| 2013/0021013 A1* | 1/2013 | Kondou | H02M 1/36 323/283 |
| 2013/0077353 A1* | 3/2013 | Kuang | H05B 33/0815 363/20 |
| 2013/0127431 A1 | 5/2013 | Ansari | |
| 2013/0293268 A1* | 11/2013 | Draxelmayr | H02M 1/08 327/109 |
| 2014/0233283 A1* | 8/2014 | Al-Shyoukh | H02M 1/36 363/49 |
| 2015/0023072 A1* | 1/2015 | Al-Shyoukh | H02M 1/36 363/49 |
| 2015/0257231 A1* | 9/2015 | Mentze | H05B 33/0815 315/307 |
| 2016/0322906 A1* | 11/2016 | Hwang | H02M 1/36 |
| 2016/0359419 A1* | 12/2016 | Lin | H02M 1/08 |

OTHER PUBLICATIONS

Jung and Kim, "A Low Stand-by Power Start-up Circuit for SMPS PWM," Proceedings of the Great Lakes Symposium on VLSI, pp. 251-254 (2012).

* cited by examiner

SWITCHING POWER SUPPLY STARTUP CIRCUIT WITH NORMALLY ON DEVICE PROVIDING STARTUP CHARGING CURRENT

SUMMARY

When input power is initially applied to a switching power supply, it is necessary to deliver energy to control circuits for the purpose of starting operation. The circuitry used for this purpose is commonly referred to as the "startup circuit". Because the power supply is not yet generating output power during startup, the startup circuit obtains power from the input in some manner. One of the challenges in a switching power supply is providing the initial energy to power the control circuitry when the operating voltage limits for the control devices are far below the input voltage range of the power supply. This problem exists for DC/DC converters that receive input power from 24V or 48V nominal DC sources, for example. This is also a consideration in AC/DC power supplies that operate from input voltages that can be as high as 305 VAC and in typical applications range from 90 VAC to 264 VAC.

In order to start a switching power supply when the input voltage is large relative to the normal operating voltage of primary-side-referenced control circuits, a capacitor can be charged from the input source through either a resistor or a current source. A circuit monitors the capacitor voltage and turns on the control circuitry when the capacitor voltage reaches approximately the upper operating voltage of that circuitry. The control circuitry once enabled draws energy from the charged capacitor. When startup completes and normal operation commences, the normal operating circuitry of the power converter can supply the energy required to maintain the voltage across this startup capacitor to a value within the operating limits of the control circuitry.

The circuitry that monitors the startup capacitor voltage and turns on the control circuitry may require only a small current (e.g., 500 uA to 1 mA) during startup, and the resistor or current source that feeds the startup capacitor is sized to provide this current at a minimum input voltage that is present during startup. This sizing can result in much higher power dissipation by the circuitry at the larger maximum input voltage occurring during normal operation. Moreover, this higher power dissipation occurs irrespective of the output loading of the power converter, i.e., whether the converter is online and providing power to a load or is offline or "standby" and not providing power to a load.

Offline power supplies are subject to market or regulatory requirements that place limits on no-load power loss. Thus, it is desirable to reduce no-load power losses as much as possible, including losses attributable to startup circuitry such as described above.

A disclosed power converter includes a startup circuit that achieves reduced no-load power loss while providing the desired function of establishing an operating voltage for control circuitry during a startup period. The startup circuit has a normally on characteristic such that it automatically provides startup charging current for a startup capacitor once the input voltage has risen sufficiently high, without operation of any separately powered control circuitry. The control circuitry begins operating as the startup capacitor voltage reaches an operating value, and it generates an inhibitory signal that disables the startup circuit, stopping the flow of the startup charging current and reducing the power dissipation of the startup circuit to a desired low value. The normally on characteristic is achieved through use of an emitter switched current source employing a normally on switching device, such as a depletion-mode junction field-effect transistor (J-FET). Such a device has a source-drain channel that conducts current in the absence of a control voltage on the gate of the device, and this feature is exploited for use during startup when control circuitry is not yet operating. Additionally, the source-drain channel can be cutoff by application of a sufficiently high control or bias voltage to the gate of the device, and this feature is exploited for use after startup to prevent current flow and reduce power dissipation by the startup circuit during subsequent normal operation.

Thus a J-FET is a good candidate as a switch device used as part of a startup current source. When power is initially applied and no bias voltages are available from the power converter, a J-FET device can be used to establish the flow of startup capacitor charging current. When the control circuitry comes alive and the power converter is operational, a voltage from the control circuitry can be applied to the gate of the J-FET to turn it off and disable the charging current. One issue with readily available J-FETs, however, is relatively low voltage rating (e.g., less than 50V) which is far below the typical voltages that need to be switched for many startup current source applications. Thus, in a disclosed startup circuit a J-FET is used as a switch in an emitter-switched current source employing a bipolar transistor as the main current-control element. This configuration reduces the voltages experienced by the J-FET even in higher-voltage applications.

In the disclosed startup current source the normally on transistor is arranged in series with the startup capacitor used to hold the auxiliary voltage, and thus it is required that the gate voltage of the transistor be driven sufficiently high to turn the transistor off as normal operation beyond startup commences. A charge pump circuit is arranged between a controller that generates a clock signal and the normally on transistor, and it includes a capacitor-diode network that responds to the clock signal by providing a higher-voltage signal to the gate of the normally on transistor.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
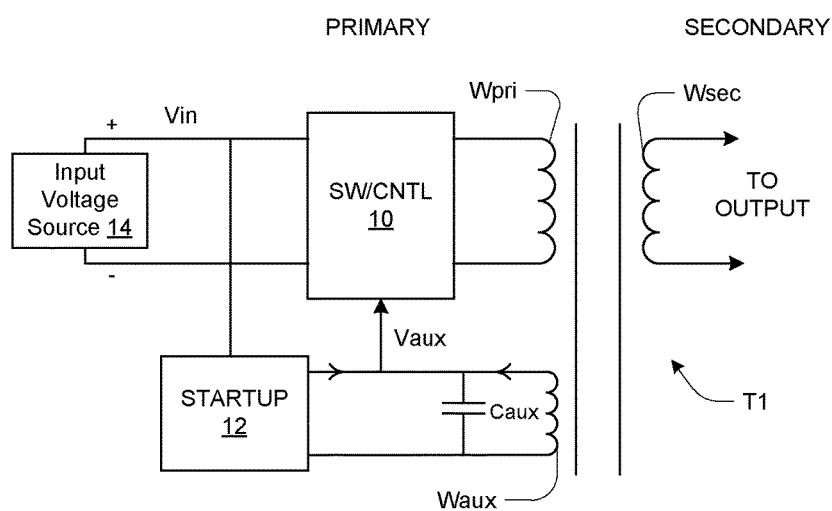
FIG. 1 is a schematic block diagram of a power supply.

FIG. 1 is a schematic block diagram of a portion of a switching power supply. It includes switching and control (SW/CNTL) circuitry 10, a power transformer T1, a startup circuit 12, and optionally an input voltage source 14. The transformer T1 has main primary and secondary windings Wpri and Wsec, as well as a third or "auxiliary" winding Waux connected to a capacitor Caux. The switching and control circuitry 10 receives a DC voltage Vin as well as a voltage Vaux developed on the capacitor Caux. The voltage Vin is provided by the input voltage source 14 when present, and otherwise it may be an input from a separate voltage source.

Pertinent operation of the power supply is divided into two periods, an initial startup period in which Vin is rising from zero to a normal operating value, and a subsequent steady-state operating period in which Vin is at its normal operating value and the power supply is providing a steady DC output voltage to separate powered circuitry (not shown). The switching and control circuitry 10 includes circuitry (not shown in FIG. 1) that receives its operating power from the Vaux input; examples are described below. During steady-state operation, the combination of the winding Waux and capacitor Caux function as a simple power source for this circuitry. During at least an initial part of the startup period, little or no current is provided to the main primary winding Wpri and therefore no or little power is available via the winding Waux. The startup circuit 12 operates during this period along with Caux as the power source, until operation has proceeded to the point that the normal steady-state mechanism employing winding Waux is available and becomes operative.

Figure 2:
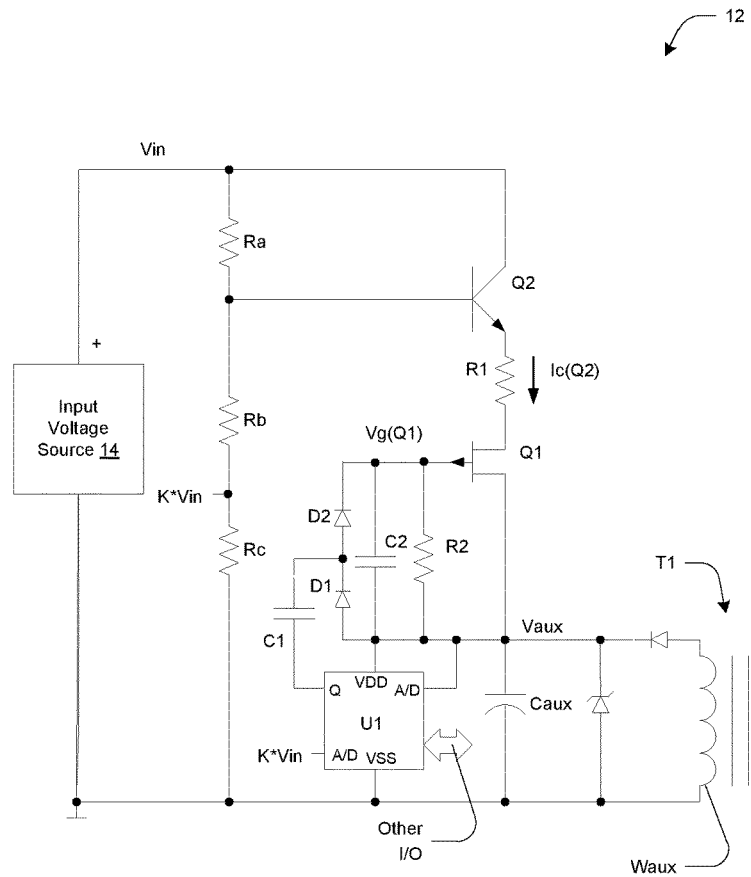
FIGS. 2 through 4 are schematic diagrams of alternative implementations of a startup circuit.

FIG. 2 shows the startup circuit 12 according to one embodiment. Its main purpose is to generate an unregulated supply voltage Vaux usable by the switching and control circuitry 10 (FIG. 1) during an initial startup period of operation before all normal operating voltages have been established. Vaux is generated by supplying a charging current Ic(Q2) to the capacitor Caux, the current being provided by an emitter-switched current source realized by transistors Q2 and Q1. Q1 is a normally on transistor, and may be implemented as a depletion-mode junction FET (J-FET) for example. It conducts during startup to provide the charging current Ic(Q2) to Caux, and at the end of startup it is rendered non-conducting by application of an inhibitory control signal in the form of a positive gate voltage Vg(Q1). This effectively disables the startup circuit 12, reducing its power dissipation and improving overall efficiency of the power supply accordingly. Detailed operation is described below.

In the circuit of FIG. 2, the collection of components including a controller U1, resistor R2, diodes D1 and D2, and capacitors C1, C2 serve as a generator of the gate voltage Vg(Q1). Because of the normally on characteristic of Q1, Vg(Q1) is generated so as to turn Q1 off, i.e., to inhibit conduction of the charging current Ic(Q2), and thus Vg(Q1) may be viewed as an inhibitory control signal. This circuitry has two distinct aspects of operation, namely control and level-shifting. Control is provided primarily by the controller U1. Level-shifting refers to generating a high-voltage signal Vg(Q1) from a lower-voltage output Q of the controller U1, and is provided by a charge pump that is realized by the collection of components including U1.

In the illustrated arrangement, transistor Q1 is a P-Channel depletion mode J-FET. A depletion mode FET is on (conducting) when zero volts is applied to its gate, and is turned off when a voltage in excess of a cutoff voltage is applied to its gate. At the very beginning of startup operation when Vin is equal to zero, Vg(Q1) has zero volts applied and Q1 behaves as if it were a resistor connected from the emitter of Q2 to the return potential. Once the voltage on the base of Q2 becomes high enough to establish current flow through Q2's base-emitter junction, Q2 begins conducting. Its collector current is proportional to the voltage across R1. The Q2 collector current Ic(Q2) flows in a path through Q1 that allows it to charge Caux.

When Caux is charged to a sufficiently high voltage that allows startup of the power converter, the switching/control circuitry (FIG. 1) begins operating, causing current to flow in the primary winding Wpri and by magnetic coupling in the auxiliary winding Waux as well. This current maintains the voltage Vaux across Caux as part of steady state operation of the power supply. Additionally, at this point the startup circuit 12 generates an inhibitory control signal in the form of a non-zero gate voltage Vg(Q1), which is supplied to the gate of Q1 in order to turn Q1 off. When Q1 is off, the startup current used to charge Caux is terminated. With the startup current disabled, no power loss from the startup circuit exists other than small losses from the input voltage monitoring divider Ra, Rb and Rc.

It is necessary to raise the gate of Q1 above Vaux in order to pinch off Q1 and terminate the charging current Ic(Q2) once steady state operation is established. Sufficient voltage is provided by the charge pump circuit including C1, C2, D1 and D2 along with a rectangular clock source from the output Q of the controller U1. The rectangular clock source is defined as a signal that switches from approximately VDD to approximately VSS at a fixed or variable frequency. Note that in the illustrated arrangement VDD is equal to Vaux and VSS can be taken as zero. The time that the Q output is at VDD is defined as the on time while the time that the Q output is at VSS is defined as the off time. During the off time, the capacitor C1 is charged to a voltage approximately equal to Vaux less the forward voltage drop of D1. During the on time, this capacitor voltage is essentially shifted up by approximately VDD, so that the voltage at the upper node of the capacitor Caux becomes approximately equal to VDD+Vaux−Vfwd(D1)−Vfwd(D2), where "Vfwd" refers to the forward-biased voltage drop across the diodes. Assuming that VDD=Vaux and that Vfwd=0.6V the voltage at the gate of Q1 will be approximately 2*Vaux−1.2V with respect to the circuit return. Charge is transferred from C1 to C2 and after several switching cycles the steady state voltage drop across the gate to source of Q1 will be approximately Vaux−1.2V. For typical Vaux values the voltage of the gate of Q1 is raised sufficiently above the source of Q1 to turn Q1 off and terminate the charge current Ic(Q2). During the off time R2 will bleed some of the charge off of C2 that will then be replenished during the next on time cycle. As long as the clock is present on the Q output of the controller U1, Q1 will remain off and the branch of the circuit consisting of the series combination of Q2(CE), R1 and Q1(DS) will not dissipate power. If the described clock signal stops switching, defined as continuously in the on state or off state, no charge will be transferred to C2, R2 will eventually bleed the voltage across C2 to zero, and Q1 will turn back on and re-establish a current path to charge Caux.

The circuit of FIG. 2 employs an emitter switched configuration with the JFET Q1 directly charging Caux. The emitter switched configuration is desirable due to the low VDS rating of practical JFET devices; Q2 effectively absorbs much of the voltage difference Vin−Vaux. The implementation of the startup circuit in FIG. 2 can be useful when operating power dissipation benefits are desired and a startup Caux charging current that varies with applied input voltage can be tolerated.

As described, the controller U1 is a microcontroller device that generates the described clock signal on a digital output pin. It also monitors signals to facilitate various controlling features such as starting and stopping the startup current path to control the startup voltage across Caux.

Another feature of the startup circuit 12 is the ability to measure the input voltage Vin by sensing the voltage at the junction of a resistive divider circuit formed by the resistors Ra, Rb and Rc that provides two divided down voltages. Neglecting what should be negligible base current, the voltage at the base of Q2 will be approximately equal to Vin*(Rb+Rc)/(Ra+Rb+Rc). A voltage shown as K*Vin that is proportional to Vin and used for the purpose of monitoring Vin will be approximately equal to Vin*Rc/(Ra+Rb+Rc). When the startup current path is enabled the startup current magnitude depends on the instantaneous voltage of Vin as well as the instantaneous voltage across Caux. This start up current will approximately equal the instantaneous voltage across Caux, subtracted from the voltage on the base of Q2 less Q2's $V_{BE}$, divided by R1.

One of the advantages of the disclosed startup circuit is the ability to provide startup energy to a microcontroller such as controller U1. A microcontroller provides the ability to generate optimum control of the turn off signal, and can be configured for this purpose as shown in FIG. 2. When the voltage Vaux reaches a value that establishes operating voltage for the microcontroller, the microcontroller can manage the turn off for Q1. A voltage K*Vin proportional to the startup voltage is monitored by either an analog to digital converter or a comparator within the microcontroller. A software algorithm is then used to decide when to terminate the startup current source by generating a digital output that results in applying a voltage to the gate of Q1.

Figure 3:
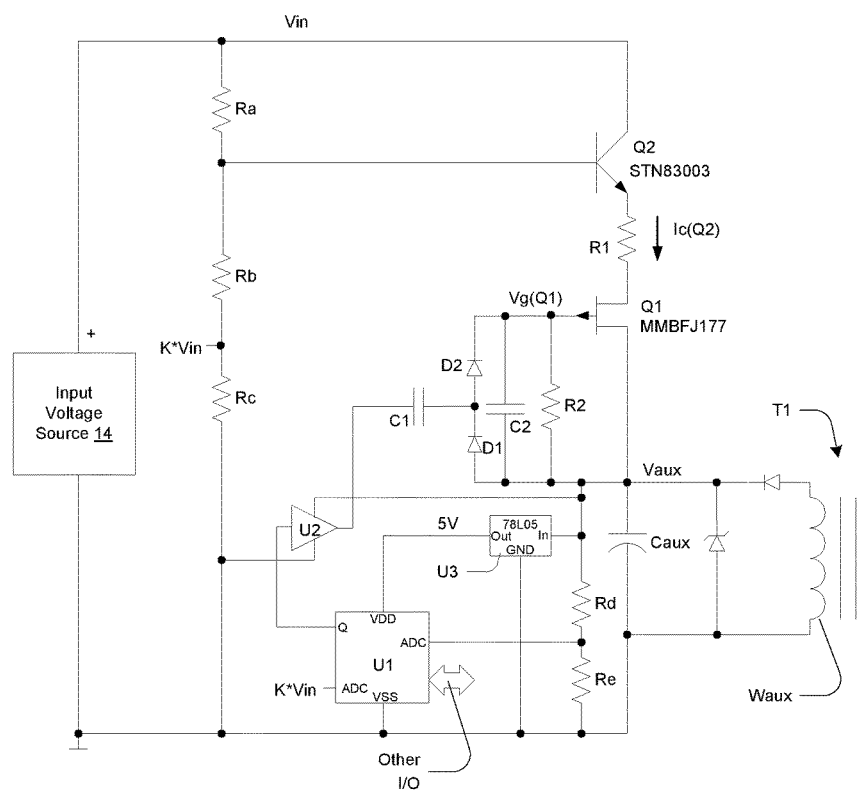

FIG. 3 shows an alternative in which the controller U1 is not powered directly by Vaux. In many applications Vaux may be about 12V, while most microcontroller or DSP devices used in such applications have a maximum supply voltage limitation of 5V or 3.3V. Thus, a small linear regulator U3 is employed to provide a VDD to U1 of about 5 volts, from the larger Vaux. In this case the amplitude of the Q output is limited to about 5 volts, which is insufficient to achieve the desired level of Vg(Q1). Thus, a gate driver U2 powered by Vaux is used to buffer this signal, thus providing an amplitude of Vaux to the charge pump for driving Vg(Q1) to an appropriately high level as described above.

In a circuit such as FIG. 3 the voltage Vaux may be used primarily as a gate drive level for other switching devices that may be present in the power supply. The digital output from the microcontroller U1 that is delivered to the input of the driver U2 can be an independent signal used solely for the purpose of generating the charge pump clock. This digital output can also be a PWM output that is also used as a PWM control signal for switching devices, as describe more below with reference to FIG. 4.

Also in FIG. 3, a resistor divider including resistors Rd and Re provides a divided down representation of Vaux so that a scaled value of this signal not exceeding the input ratings is connected to the microcontroller device U1.

Figure 4:
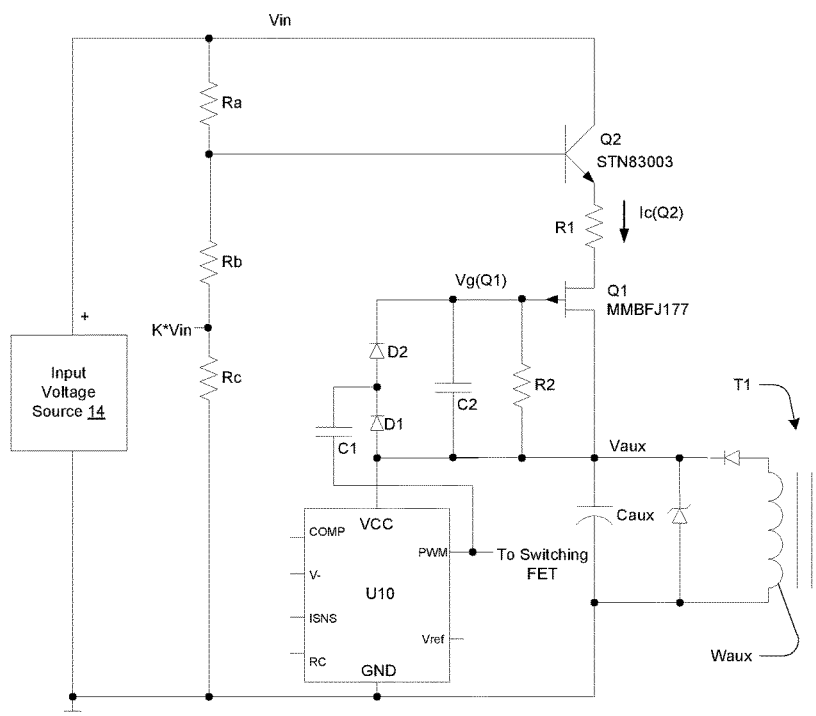

FIG. 4 shows another alternative in which a controller device U10 is a PWM controller, such as a UCC3842, and the PWM output is used as the clock source that drives the charge pump circuit. This is the same PWM output that is used to control switching device(s) in the switching/control circuitry 10 (FIG. 1). In this implementation Q1 is initially on when power is supplied to the circuit, establishing a path for current to flow in order to charge Caux. When the voltage across Caux is sufficient for the PWM controller to turn on and start delivering PWM pulses, the PWM pulses become the clock source that generates the gate voltage Vg(Q1) required to turn off Q1 as described above.

Figure 5:
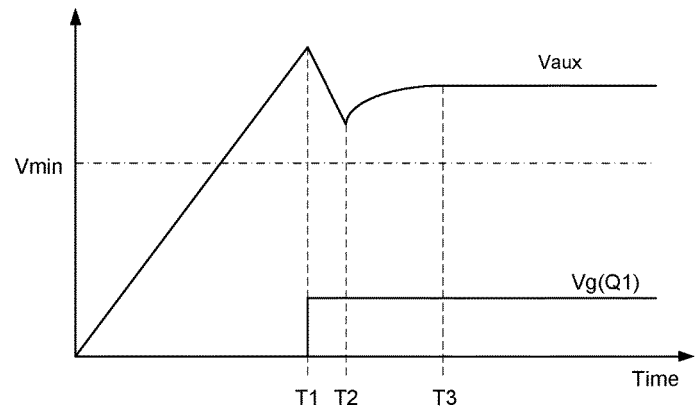
FIGS. 5-7 are waveform diagrams of signals in a power supply during startup.

FIG. 5 depicts the voltage Vaux across Caux during normal operation of a switching power supply. From the application of fixed input voltage at time t=0 the voltage Vaux rises as Caux is charged with a constant current. At time T1 the Vg generator controlling Q1 determines that Vaux has reached its desired value, so Vg(Q1) is driven to a voltage capable of turning Q1 off. At that point the power supply's control circuit is enabled and it draws energy from Caux causing Vaux to begin to decrease as energy is removed. At time T2, Vaux has not decreased below the minimum operating voltage for the control circuitry, Vmin, and the auxiliary winding Waux has become capable of supplying energy to the control circuitry. At this point the delivered energy brings Vaux up to its nominal operating value sustaining continuous operation of the power supply.

Figure 6:
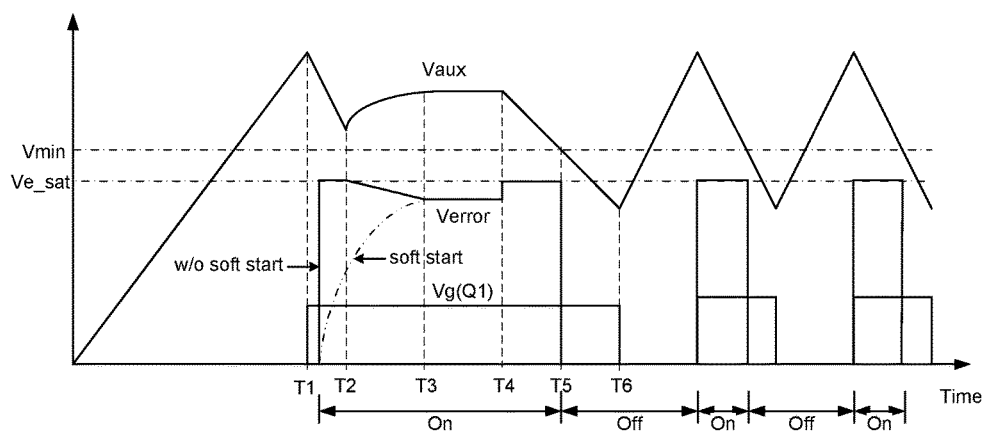

FIG. 6 depicts operation of the startup circuit when an overload fault occurs on one of the outputs of the switching power supply controlled by a circuit powered from Vaux. An additional signal, Verror, is drawn on this graph. Verror is the error voltage for the switching power supply and is used to set operating duty cycle to maintain the desired output voltage. If the control of the power supply is digital rather than analog there is an equivalent operating parameter that exists in the control software that can be queried for similar behavior. In the analog control approach this signal is generated by comparing the controlled output voltage to a reference with an amplifier that has sufficient gain. In the digital control approach it is a calculated parameter. In the case of an isolated power supply with analog control this signal is coupled to the primary side through an isolation device such as an opto-coupler. In the event of an overload condition the output voltage will drop below the reference value and the Verror signal will increase to its saturation level indicated as Ve_sat. If both of those conditions exist the control of Q1's gate is designed so that Q1 is kept off until a desired trough is reached. Sometime prior to that point the switching power supply will turn off. At that trough point Q1 is allowed to turn on so that energy in Caux can be replenished. The power supply will attempt a normal startup. If the fault condition is removed the power supply will restart and re-establish normal operation. If the fault remains the power supply will continue the turn on and turn off pattern which is intended to reduce the average stresses during the fault condition. This mode of protection is often referred to as hiccup. This circuit allows hiccup mode which can be managed by the control of Q1's gate.

One advantage of using the disclosed startup circuit is the ease of turning on and off the startup current source to reduce power dissipation when it is not needed. When Q1 is controlled with a microcontroller the ease of turning on and off the startup current source can be used as an advantage in solving a problem that commonly occurs with regulated power supplies that employ an auxiliary winding to generate Vaux during steady state operation. This auxiliary winding is not regulated but rather coupled to a winding that produces a regulated voltage. Since the auxiliary winding is on the primary side and the regulated winding is typically on the secondary side safety requirements force the transformer (or coupled inductor) construction to be such that the coupling between these windings is compromised. At light loads the poor coupling can be such that the auxiliary winding is not capable of providing the energy required to keep Vaux above the minimum operating voltage of the control circuitry. This can be solved with the FIG. 2 circuit when it is controlled by a microcontroller that also monitors the error voltage used to set regulation.

Figure 7:
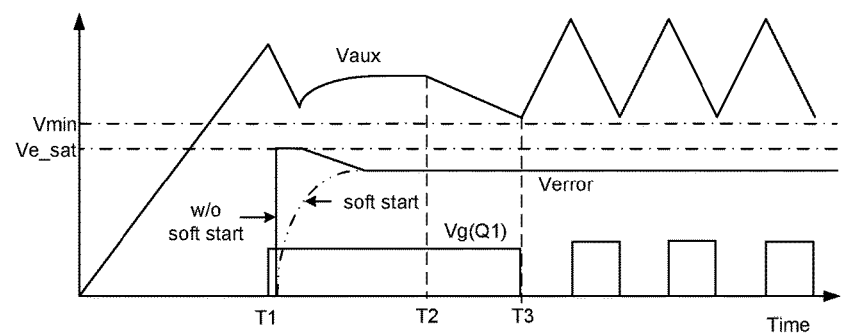

FIG. 7 shows a mode of operation that can be executed by a microcontroller. The microcontroller can run software that distinguishes between allowing the mode of operation shown in FIG. 6 or forcing the mode of operation shown in FIG. 7 based on the relationship between Verr and Vaux. The mode of operation in FIG. 7 prevents Vaux from falling below a minimum value when the power supply should be sustaining its output. These can be determined by using Verror as a proxy as to whether the regulated output is in regulation which is the case when Vaux is not at its saturation level. The microcontroller can control the FIG. 2 circuit to behave as a repetitively pulsed current source to keep Vaux above a minimum threshold. This is another possible operating mode of the disclosed startup circuit.

While various embodiments of the invention have been particularly shown and described, it will be understood by those skilled in the art that various changes in form and details may be made therein without departing from the spirit and scope of the invention as defined by the appended claims.

What is claimed is:

1. A switching power supply, comprising:
   a storage capacitor coupled to a power magnetic element to maintain a steady state value of an auxiliary voltage during steady state operation of the switching power supply, the steady state operation being preceded by a startup period in which an input-side DC voltage of the switching power supply rises from zero toward a steady state operating value;
   switching and control circuitry configured to couple energy from the input-side DC voltage to the power magnetic element during the steady state operation, the switching and control circuitry including control circuitry powered by the auxiliary voltage; and
   a startup circuit configured and operative during the startup period to generate a startup value of the auxiliary voltage to enable the control circuitry to establish the steady state operation, the startup circuit including (i) a startup current source coupled between the input-side DC voltage and the storage capacitor to provide charging current thereto based on the absence of an inhibitory control signal, the startup current source including an emitter-switched current source having a normally on switching transistor in series with the storage capacitor, the inhibitory control signal being applied to a gate of the normally on switching transistor to cause the normally on switching transistor to conduct the charging current in the absence of the inhibitory control signal and to not conduct the charging current in the presence of the inhibitory control signal, and (ii) a generator of the inhibitory control signal, the generator being configured and operative during the startup period to generate the inhibitory control signal in response to the auxiliary voltage reaching the startup value by charging action of the startup current source and to maintain the inhibitory control signal during subsequent steady state operation, the generator including a charge pump providing a voltage of the inhibitory control signal sufficiently above the auxiliary voltage to turn off the normally on switching transistor.

2. The switching power supply according to claim 1, wherein the charge pump circuit includes a capacitor-diode network along with a rectangular clock source and is operative (1) during an off time of a clock signal, to charge a capacitor to a voltage approximately equal to the auxiliary voltage less a forward diode voltage drop, and (2) during an on time of the clock signal, to apply a voltage to one terminal of the capacitor to raise a voltage at the other terminal of the capacitor accordingly, the other terminal being diode-connected to the gate of the normally on transistor to apply the gate voltage thereto.

3. The switching power supply according to claim 2, including a driver configured and operative in response to an input clock signal from a controller to deliver the clock signal to the capacitor-diode network, and further including a linear regulator circuit to lower the voltage delivered to the controller while maintaining the clock signal that switches between the auxiliary voltage and return potential by powering the driver directly from the auxiliary voltage.

4. The switching power supply according to claim 1, including a PWM controller having a PWM output used as a clock source that drives the charge pump, the PWM output being the same PWM output used to control a switching device in the switching and control circuitry, and wherein (1) the normally on transistor is initially on when power is supplied, establishing a path for current to flow to charge an auxiliary capacitor to generate the auxiliary voltage, and (2) when the voltage across the auxiliary capacitor is sufficient for the PWM controller to operate and start delivering PWM pulses, the PWM pulses serve as a clock source for generating the gate voltage required to turn off the normally on transistor.

5. The switching power supply according to claim 1, wherein the emitter-switched current source includes a bipolar transistor having an emitter in series with the normally on transistor, the bipolar transistor conducting the charging current as collector current when the normally on transistor is also conducting.

6. The switching power supply according to claim 5, wherein the startup circuit includes a resistor divider network having an intermediate node coupled to a base of the bipolar transistor to control conduction of the charging current, the resistor divider connected between the input voltage and a reference node and generating a voltage sensing signal on the intermediate node, and wherein the control circuitry is configured and operative to use the voltage sensing signal to represent the input-side DC voltage in controlling operation of the switching and control circuitry.

7. The switching power supply according to claim 1, wherein the normally on transistor is a depletion-mode field-effect transistor.

8. The switching power supply according to claim 1, wherein the generator of the inhibitory control signal is an active circuit configured and operative to generate a binary voltage signal transitioning at the end of the startup period to a first binary voltage taken as the inhibitory control signal.

9. The switching power supply according to claim 8, wherein the active circuit includes a microcontroller.

10. The switching power supply according to claim 1, further including rectification circuitry configured and operative to generate the input-side DC voltage from AC source voltage supplied thereto.

11. The switching power supply according to claim 1, further including a transformer having primary and secondary windings, the primary winding being coupled to receive the input-side DC voltage, the secondary winding coupled to an output of the power supply to provide output power at a DC output voltage, and wherein the power magnetic includes an auxiliary winding of the transformer.

12. The switching power supply according to claim 1, wherein the generator of the inhibitory control signal is realized by a microcontroller executing a processing routine responsible for generating the inhibitory control signal during the startup period.

13. The switching power supply according to claim 1, wherein the switching and control circuitry generates an error voltage used to set operating duty cycle to maintain the desired output voltage, the error voltage increasing to a saturation level in the event of an overload condition in which the output voltage drops below a predetermined reference value, and wherein the emitter-switched current source is controlled (a) to be maintained in a non-conducting condition until a desired trough of the auxiliary voltage is reached after the switching power supply has turned off due to the overload condition, and (b) at the desired trough, to become conducting so that energy in the auxiliary capacitor is replenished and the switching power supply attempts a normal startup.

14. The switching power supply according to claim 13, wherein the turning off and attempted startup of the power supply are repeated multiple times in a hiccup mode of operation, the hiccup mode being one mode selectable by a microcontroller that generates the inhibitory control signal by executing a processing routine during the startup period, and wherein the microcontroller can separately select a non-hiccup mode in which the auxiliary voltage is prevented from reaching the desired trough value under circumstances in which the power supply is required to sustain its output voltage, the non-hiccup mode being effected by repetitively pulsing the startup current source to maintain the auxiliary voltage above a predetermined threshold and being selected based on whether the error voltage is at the saturation level.

\* \* \* \* \*